United States Patent
Petsko et al.

[11] Patent Number: 6,018,650
[45] Date of Patent: Jan. 25, 2000

[54] CELLULAR COMMUNICATION DEVICES WITH AUTOMATED POWER LEVEL ADJUST

[75] Inventors: David P. Petsko, Akron; Michael S. Dollard, Independence, both of Ohio

[73] Assignee: Aironet Wireless Communications, Inc., Fairlawn, Ohio

[21] Appl. No.: 08/769,214

[22] Filed: Dec. 18, 1996

[51] Int. Cl.[7] .................................................. H03G 3/30
[52] U.S. Cl. ................................ 455/234.1; 455/232.1; 455/245.1
[58] Field of Search .................................. 455/115, 127, 455/69, 126, 67.1, 117, 234.1, 245.1; 330/207 P, 279

[56] References Cited

U.S. PATENT DOCUMENTS

| | | | |
|---|---|---|---|
| 4,122,400 | 10/1978 | Medendorp et al. | 330/207 P |
| 4,517,526 | 5/1985 | Di Cicco | 330/284 |
| 4,523,155 | 6/1985 | Walczak et al. | 330/279 |
| 4,547,746 | 10/1985 | Erickson et al. | 330/289 |
| 4,602,218 | 7/1986 | Vilmur et al. | 330/279 |
| 4,989,074 | 1/1991 | Matsumoto | 348/572 |
| 5,029,182 | 7/1991 | Cai et al. | 375/202 |
| 5,038,112 | 8/1991 | O'Neill | 330/207 P |
| 5,129,098 | 7/1992 | McGirr et al. | 455/69 |
| 5,278,992 | 1/1994 | Su et al. | 455/69 |
| 5,287,555 | 2/1994 | Wilson et al. | 455/115 |
| 5,331,638 | 7/1994 | Honkasalo et al. | 370/347 |
| 5,369,789 | 11/1994 | Kosugi et al. | 455/126 |
| 5,392,300 | 2/1995 | Borth et al. | 714/761 |
| 5,423,081 | 6/1995 | Thiele et al. | 455/116 |
| 5,423,082 | 6/1995 | Cygan et al. | 455/126 |
| 5,606,285 | 2/1997 | Wang et al. | 330/134 |
| 5,689,815 | 11/1997 | Yamazaki et al. | 455/69 |
| 5,715,527 | 2/1998 | Horii et al. | 455/126 |
| 5,854,845 | 12/1998 | Itani | 381/108 |

*Primary Examiner*—Reinhard J. Eisenzopf
*Assistant Examiner*—Charles N. Appiah
*Attorney, Agent, or Firm*—Arter & Hadden LLP

[57] ABSTRACT

A cellular communication device for a cellular communication network which includes a radio-frequency (RF) transmitter for transmitting an RF signal at an output power level to one or more other devices in the cellular communication network; an RF receiver for receiving an RF signal from one or more other devices in the cellular communication network; and a gain control circuit for sampling the output power level to obtain a sampled output power level signal, digitizing the sampled output power level signal, and adjusting a gain of the RF transmitter based on the digitized sampled output power level signal in order that the output power level of the RF transmitter approaches a predefined output power level. The gain may also be adjusted in response to the Received Signal Strength Indicator (RSSI) in order to conserve battery power.

18 Claims, 6 Drawing Sheets

CELLULAR COMMUNICATION DEVICES WITH AUTOMATED POWER LEVEL ADJUST

TECHNICAL FIELD

The present invention relates generally to cellular communication networks, and more particularly to cellular communication devices used within such networks.

BACKGROUND OF THE INVENTION

In recent years, the use of cellular communication networks or systems having mobile devices which communicate with a hardwired network, such as a local area network (LAN) or a wide area network (WAN), has become widespread. The mobile devices, commonly referred to as mobile terminals, may take one of several different forms. For instance, in retail stores hand-held scanning units may be used to allow for scanning inventory bar codes. In a warehouse, portable units mounted to a vehicle may be used to gather information from the warehouse floor. In a medical environment, the mobile terminal may take the form of a pen based workslate which allows medical personnel to work with full page screens at once.

In a typical cellular communication network, each mobile terminal communicates with a networked system via a radio link in order to allow for a real time exchange of information. The mobile terminals communicate through one of several base stations interconnected to the network. The base stations allow for a wireless data communication path to be formed.

Each mobile terminal and base station communicate via their respective transmitter and receiver (i.e., transceiver) systems. Typically, the transmitter and receiver in each device share the same antenna and a control signal is used to switch the antenna between a transmitting and receiving mode.

Due to various local and/or federal regulations relating to the use of cellular communication devices such as mobile terminals and base stations, these devices are designed to transmit information at or below a predetermined power level. For example, telecommunication standards adopted by the Federal Communication Commission (FCC) in the United States of America requires that cellular communication devices not exceed a predetermined maximum output power level when transmitting information. Various international telecommunication standards such as the ETSI in Europe and MKK in Japan also have adopted similar requirements. Consequently, manufacturers of cellular communication devices may, at least in theory, set the output power level at approximately the maximum allowed output power level.

Unfortunately, due to several factors including temperature swings, component selection and tolerances, wear, frequency variations, etc., the actual output power can vary substantially. For instance, in the United States a 20 decibel/milliwatt (dBm) rated output power level for a mobile terminal or base station can vary by as much as 3 dB simply due to changing temperature conditions alone. Given the limitations set by the FCC, manufacturers are therefore forced to reduce their rated output power level from the maximum allowable by the FCC in order to avoid situations where the output power drifts above the permitted maximum due to one or more of the factors mentioned above. This, in turn, significantly reduces the maximum obtainable range of each of the devices.

In order to better maintain a constant output power level, automatic gain control (AGC) loops have been used in radio transmitters. AGC uses an analog circuit to compare an output power level with a reference power level and adjust the gain according to the difference at any given time. Unfortunately, AGC loops are quite complicated to construct and manufacture due to the need for precise analog components and are typically only useful in linear gain type systems.

Furthermore, the power needed by a mobile terminal to carry out the wireless communications described above typically is supplied from a rechargeable battery included in the mobile terminal. Rechargeable batteries composed of Ni-Cad, Li-Ion or Ni-metal-Hydride are often used. Therefore, in addition to the desire to transmit information at the maximum allowable power level, battery life conservation is also of significant concern in order to extend the working life of the mobile terminal prior to needing recharging.

In view of the aforementioned shortcomings associated with existing cellular communication devices, there is a strong need in the art for a method and system for automatically controlling the output power of such devices. There is a strong need for such a device which allows the output power level to be maintained at or near the maximum output power level allowed by the relevant regulating body. Further, there is a strong need for such a device which can also conserve battery life when certain operating conditions are met.

SUMMARY OF THE INVENTION

According to one aspect of the invention, a cellular communication device for a cellular communication network is provided which includes a radio-frequency (RF) transmitter for transmitting an RF signal at an output power level to one or more other devices in the cellular communication network; an RF receiver for receiving an RF signal from one or more other devices in the cellular communication network; and a gain control circuit for sampling the output power level to obtain a sampled output power level signal, digitizing the sampled output power level signal, and adjusting a gain of the RF transmitter based on the digitized sampled output power level signal in order that the output power level of the RF transmitter approaches a predefined output power level.

In accordance with another aspect of the invention, a cellular communication device for a cellular communication network is provided which includes a radio-frequency (RF) transmitter for transmitting an RF signal to one or more other devices in the cellular communication network; an antenna coupled to an output of the RF transmitter; an RF receiver for receiving an RF signal from one or more other devices in the cellular communication network; and a circuit for sensing an amount of output power reflected back into the output of the RF transmitter.

According to yet another aspect of the invention, a cellular communication device for a cellular communication network is provided which includes a radio-frequency (RF) transmitter for transmitting an RF signal to one or more other devices in the cellular communication network; an antenna coupled to an output of the RF transmitter; an RF receiver for receiving an RF signal from one or more other devices in the cellular communication network; and a circuit for sensing an amount of output power reflected back into the output of the RF transmitter.

In accordance with yet another aspect of the invention, a cellular communication device for a cellular communication network is provided which includes a radio-frequency (RF)

transmitter for transmitting an RF signal to one or more other devices in the cellular communication network; an RF receiver for receiving an RF signal from one or more other devices in the cellular communication network; and a circuit for obtaining a received signal strength indicator (RSSI) indicative of the strength of an RF signal received by the RF receiver, and a circuit for adjusting an output power level of the RF transmitter based on the RSSI.

According to another aspect of the invention, a method is provided for controlling a cellular communication device for a cellular communication network, wherein the cellular communication device includes a radio-frequency (RF) transmitter for transmitting an RF signal at an output power level to one or more other devices in the cellular communication network and an RF receiver for receiving an RF signal from one or more other devices in the cellular communication network. The method includes the steps of: sampling the output power level to obtain a sampled output power level signal, digitizing the sampled output power level signal, and adjusting a gain of the RF transmitter based on the digitized sampled output power level signal in order that the output power level of the RF transmitter approaches a predefined output power level.

In accordance with still another aspect of the invention, a radio is provided which incudes a radio-frequency (RF) transmitter for transmitting an RF signal at an output power level; an RF receiver for receiving an RF signal; and a gain control circuit for sampling the output power level to obtain a sampled output power level signal, digitizing the sampled output power level signal, and adjusting a gain of the RF transmitter based on the digitized sampled output power level signal in order that the output power level of the RF transmitter approaches a predefined output power level.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

The present invention will now be described with reference to the drawings, wherein like reference numerals are used to refer to like elements throughout.

Figure 1:
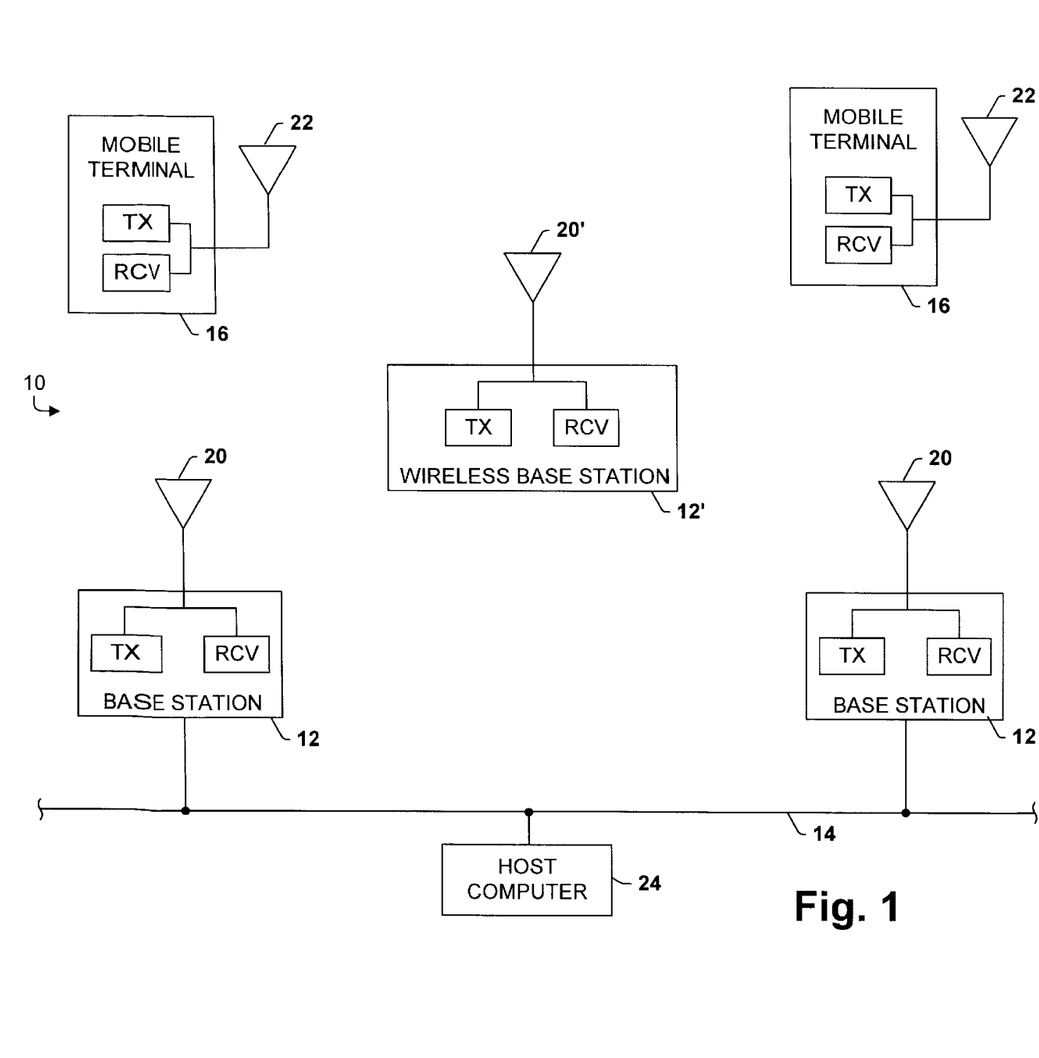
FIG. 1 is a block diagram of a cellular communication network in accordance with the present invention.

Referring initially to FIG. 1, a cellular communication network which incorporates the features of the present invention is generally designated 10. The cellular communication network 10 includes one or more base stations 12 connected together via a hardwired data communication path, commonly referred to as a system backbone 14. The cellular communication network 10 may be of the type utilized in retail stores or warehouses, for example. Such systems are useful for tracking inventory and replenishing stock. Employees may enter inventory information using a hand held or portable mobile terminal 16 which can be carried throughout the store or warehouse. The information entered into the mobile terminal 16 is then transferred to the system backbone 14, for example, by way of a base station 12 (also known in relevant part as an access point) which is coupled to the system backbone 14. In manufacturing facilities, the cellular communication network 10 can be useful for tracking parts, completed products and defects. In a medical environment, the cellular communication network 10 is useful for reducing the time needed to fill out forms and eliminate inaccuracies by allowing medical personnel to transmit data directly from a mobile terminal 106 carried by the medical personnel. Such data can then be evaluated at a central location, for example.

The system backbone 14 may be made up of a twisted pair cable, shielded coaxial cable or fiber optic lines, for example. As is discussed in more detail below in connection with FIG. 6, each base station 12 is capable of transmitting and receiving information wirelessly and exchanging such information with the system backbone 14. Each base station 12 wirelessly communicates with other devices in the network 10 via an omnidirectional antenna 20 which provides for a generally spherical area of coverage. For example, a base station 12 may transmit and receive information by way of a radio signal to/from one or more mobile terminals 16. In addition, if wireless base stations 12' (with their corresponding antenna 20') are utilized to extend the area of coverage of the base stations 12, as is known, the base stations 12 and 12' wirelessly communicate with each other. Directional yagi type antennas or other types of antennas could also be used in place of the antenna 20 as will be appreciated.

Each mobile terminal 16 is configured to wirelessly transmit and receive information via a radio signal in relation to a base station 12 with which it is registered. The mobile terminals 16 each include their own omnidirectional antenna 22 used to transmit and receive such information. The mobile terminals 16 can transmit data to a base station 12, and the base station 12 can in turn forward to information to another device such as a host computer 24 or another mobile terminal 16 via the system backbone 14, for example. The base station 12 with its corresponding antenna 20 is able to transmit and receive RF communications within a respective geographic cell. The base stations 12 are preferably positioned throughout the region on the system backbone 14 such that their combined cell area coverage allows for full wireless communication access with the mobile terminals 16 throughout the region.

As both the mobile terminals 16 and the base stations 12, 12' each include a radio transmitter as discussed more fully below, each of these devices is capable of utilizing the RF output power level adjust features of the present invention. Whether a mobile terminal 16 is transmitting information to a base station 12, 12' or vice versa, each device is designed to monitor its RF output power level. In the event the output power level drops below a predefined output power level, such as that set forth by the FCC or other regulating body, the mobile terminal 16 and/or base station 12, 12' can increase its output power level so as to increase its overall range. On the other hand, if the output power level exceeds the predefined output power level, the mobile terminal 16 and/or base station 12, 12' automatically reduces its output power level. In this manner, changes in the output power level which may otherwise occur due to changes in frequency, temperature, etc. can be compensated.

Figure 2:
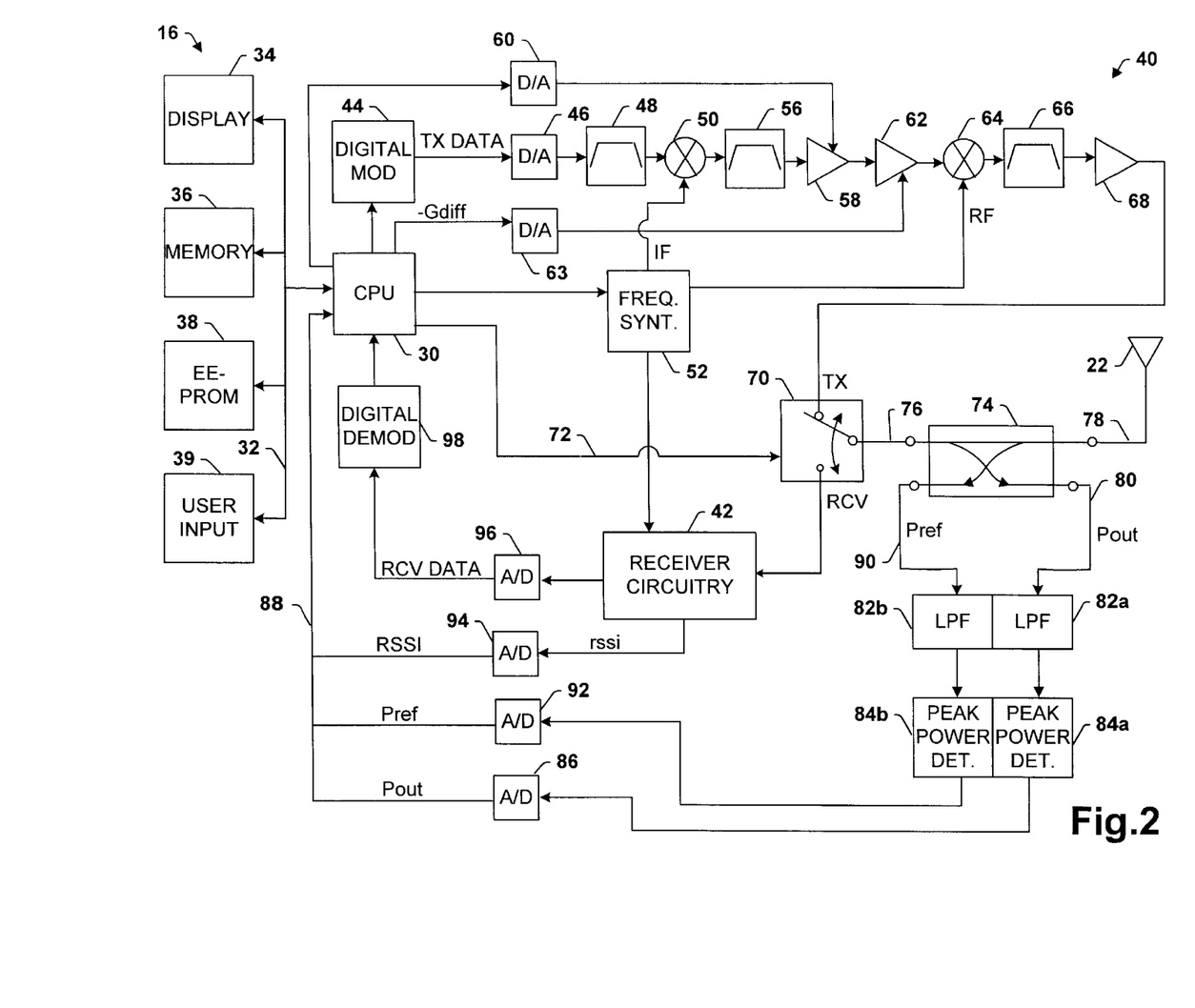
FIG. 2 is a detailed block diagram of a mobile terminal in accordance with the present invention.

Referring now to FIG. 2, an exemplary block diagram of a mobile terminal 16 is shown. Operation of the mobile terminal 16 is controlled by a processor 30 which is pre-programmed to carry out the various control functions and calculations described herein. The processor 30 is coupled through an internal bus 32 to a display 34 for displaying information to a user. Such display 34 can be a liquid crystal display (LCD) or any other type of display. The display 34 can be used to display information such as operating commands stored in the mobile terminal 16, information input by a user or received from a base station 12, 12' to which the mobile terminal 16 is registered, etc.

The mobile terminal 16 also includes a memory 36 which has both volatile and non-volatile portions. The memory 36 is accessed by the processor 30 via the bus 32 and has operating code stored therein which is executed by the processor 30 in carrying out the functions and calculations described herein. Such operating code can be easily prepared by a person having ordinary skill in the art of programming using any of several conventional programming languages based on the disclosure herein provided. Accordingly, detail regarding the specific programming code has been omitted for sake of brevity. The memory 36 also serves to store information which is entered by a user and/or received from a base station 12, 12', for example.

Also included in the mobile terminal 16 is an optional electrically erasable programmable read only memory (EEPROM) 38 or an equivalent non-volatile memory storage device. In an embodiment in which the mobile terminal 16 utilizes frequency hopping, the EEPROM 38 may be included for storing predetermined gain information relating to particular frequencies included in the hopping sequence of the mobile terminal 16. More particularly, the EEPROM 38 may include a preset deviation gain value for each particular frequency which the mobile terminal 16 will encounter in its hopping sequence. These values may be obtained initially by the manufacturer based on a comparison of the RF output power level of the RF transmitter at the different frequencies in the hopping sequence. The processor 30 accesses such gain information via the bus 32 and controls the gain of the RF transmitter within the mobile terminal 16 throughout the hopping sequence as is described more fully below. In another embodiment, the mobile terminal 16 may not include such an EEPROM 38 and simply applies the same nominal gain level to each frequency in the hopping sequence. Alternatively, the mobile terminal 16 may be of the type that does not employ frequency hopping techniques. For example, the mobile terminal 16 may utilize direct sequence spread spectrum techniques. The present invention has applicability to various different types of radios and radios operating with different modulation techniques as will be appreciated.

The mobile terminal 16 also includes a user input device 39 which allows the user to input operation commands, data, etc. The user input device 39 may include a keypad, touch sensitive display, trackball, or other input device. Moreover, the user input device 39 may include a bar code scanner for scanning information which is to be input to the mobile terminal. Information input to the mobile terminal 16 via the user input device 39 is provided to the processor 30 via the bus 32.

The radio frequency (RF) portion of the mobile terminal 16 consists primarily of a transmitter section 40 and a receiver section 42. The receiver section 42 can be made up of virtually any conventional receiver having an RSSI signal line and hence is represented simply by a block 42. With respect to the transmitter section 40, data which is to be transmitted by the mobile terminal 16 is provided by the processor 30 to a conventional digital modulator 44. The digital modulator 44 performs the particular type of modulation utilized within the network 10. For example, the digital modulator 44 may perform pseudo-number (PN) coding or some other modulation scheme such as FSK, PSK, QAM, QPSK, etc. The modulated digital data is output from the digital modulator 44 to a digital-to-analog (D/A) converter 46 which converts the digital data into an analog data signal. The D/A converter 46 provides the converted output data to a bandpass filter 48 which filters the signal prior to being input to an intermediate frequency (IF) mixer 50.

The mixer 50 mixes the data signal onto an IF frequency carrier as is known. The IF frequency carrier is provided to the mixer 50 by a frequency synthesizer 52 controlled by the processor 30. The particular value of the IF frequency is determined by the processor 30 based on the desired operation of the RF transmitter. If the mobile terminal 16 is to operate at a fixed frequency, the IF frequency provided to the mixer 50 is held constant by the processor 30. If the mobile terminal uses frequency hopping, the processor 30 may control the hopping sequence by selectively changing the output frequency provided to the mixer 50 by the frequency synthesizer 52. In the exemplary embodiment, the IF frequency may be on the order of 200–400 MHZ.

The output of the mixer 50 is provided to a surface acoustic wave (SAW) filter 56 and the filtered IF signal is input to a gain amplifier 58. In an embodiment in which the mobile terminal 16 does not include the EEPROM 38, the gain of the amplifier 58 may be fixed by the manufacturer. Ideally, the gain is set such that the output power level of the transmitter portion 40 ordinarily will not exceed a pre-defined output power level. In the case where the mobile terminal 16 does include the EEPROM 38, the gain amplifier 58 is an electrically adjustable gain amplifier. The processor 30 selectively provides deviation values indicative of how much to vary the gain for the current transmission frequency to a D/A converter 60 which converts each digital gain value to an analog gain control signal which is provided to the adjustable gain amplifier 58. The processor 30 obtains the preset deviation values from the EEPROM 38 and adjusts the gain of the amplifier 58 in synchronization with the hopping sequence employed by the mobile terminal 16. In this manner, the processor 30 controls the nominal gain value applied to each frequency in the hopping sequence. As previously mentioned, these preset deviation values are determined by the manufacturer and are stored in a table the EEPROM 38.

The output from the gain amplifier 58 is provided to the input of an adjustable gain amplifier 62 included in the transmitter section 40. Preferably, the gain amplifier 62 is capable of providing both positive and negative gain based on an analog control signal provided by the processor 30. Specifically, the mobile terminal 16 utilizes the gain amplifier 62 to increase and/or attenuate the output power level of the transmitter section 40 in order to maintain a substantially constant output power level corresponding to the desired predefined output power level. As described more fully below, the RF output power level of the transmitter portion 40 is sampled. Based on the sampled power level, the processor 30 controls the gain of the gain amplifier 62 in order that the output power level is maintained at the desired predefined output power level. In particular, the processor 30 provides a gain control value $-G_{diff}$ to a D/A converter 63 which converts the digital signal into a corresponding analog control value. The analog value of $-G_{diff}$ is provided to a gain control terminal of the adjustable gain amplifier 62 in order to adjust the particular amount of gain provided thereby. It will be appreciated that gain amplifier 58 and gain amplifier 62 could be combined such that the total gain adjustment that is required is consolidated into a single amplifier and only one of D/A converters 60, 63 are needed.

The output of the gain amplifier 62 is input to an RF mixer 64 which mixes the intermediate frequency signal up to the desired RF signal. The RF carrier is provided to the mixer 64 from the frequency synthesizer 52, and the frequency of the RF carrier is controlled by the processor 30. In the exemplary embodiment, the RF carrier is within the band of 2.4 GHz to 2.48 GHz. In the case of a frequency hopping mobile terminal 16, the processor 30 may control the hopping sequence by selectively changing the frequency of the RF carrier output from the frequency synthesizer 52. This can be done in combination with or in lieu of changing the IF frequency provided by the frequency synthesizer 52 as will be appreciated. In the case of a non-frequency hopping mobile terminal 16, the RF carrier frequency is maintained at the appropriate frequency.

The output from the mixer 64 is filtered by another bandpass filter 66 before being input to an RF power amplifier 68. In the preferred embodiment, the RF power amplifier 68 is set by the manufacturer to a preset gain level. In another embodiment, however, it will be appreciated that the gain of the RF power amplifier 68 could be adjusted in lieu of the gain amplifier 58 and/or 62 in order to control the output power level in accordance with the present invention.

The RF output signal from the power amplifier 68 is coupled to the transmit terminal of an antenna switch 70 included in the mobile terminal 16. When the antenna switch 70 is in a transmit position (TX), the RF output signal from the power amplifier 40 is coupled to the antenna 22 which is used to transmit the signal. Alternatively, when the antenna switch 70 is in a receive position (RCV), signals received by the antenna 22 are input to the receiver circuitry 42 where they are downconverted according to conventional techniques. The antenna switch 70 can be any type of switch for switching the antenna 22 between a transmitting mode and a receiving mode. For example, the antenna switch 70 can be a PIN-diode based single pole-double throw (SPDT) switch as is known. A switch control line 72 couples the processor 30 to the antenna switch 70 to allow the processor 30 to control whether the antenna 22 is in the transmitting mode or the receiving mode.

When the antenna switch 70 is in the transmit position (as shown in FIG. 2) indicating that the mobile terminal 16 is transmitting information, the output from the power amplifier 68 is input to a directional coupler 74 located between the antenna switch 70 and the antenna 22. In the preferred embodiment, the coupler 74 is a bidirectional coupler. The RF output signal is input to the coupler 74 on line 76 and substantially the entire RF output signal is output from the coupler 74 to the antenna 22 via line 78. However, the coupler 74 includes a −20 dB output onto line 80 which is utilized to sample the output power level of the RF output signal. Specifically, the coupler 74 produces an output power level signal $P_{out}$ on line 80 such that the power level of $p_{out}$ will always be 20 dB less than the power level of the RF output signal input into the coupler 74. In this manner, the signal $p_{out}$ on line 80 is representative of the output power level provided at the output of the RF transmitter section 40.

The output power level signal $p_{out}$ is filtered by a low-pass filter (LPF) 82a so as to obtain an amplitude envelope of the high frequency signal on line 80. The filtered $p_{out}$ is input to a peak power detector 84a such as a peak diode detector which is commonly known. The peak power detector 84a has known response characteristics and outputs a DC voltage whose value is representative of the power level of the RF output signal. The output from the peak power detector 84a is provided to an analog-to-digital (A/D) converter 86 which digitizes the $p_{out}$ signal to obtain a digital value $P_{out}$ which itself is representative of the output power level of the RF output signal produced by the RF transmitter section 40. The value $P_{out}$ is then provided to the processor 30 via a bus 88.

As referred to herein, lower case labels indicate an analog signal whereas uppercase labels indicate a corresponding digital signal.

Accordingly, by factoring in the known coupling ratio of the coupler 74 and the known response characteristics of the peak power detector 84a, the value $P_{out}$ provided to the processor 30 from the A/D converter 86 is indicative of actual output power level of the RF transmitter section 40 at any given time. The processor 30 utilizes such information according to a routine described below in connection with FIG. 3 to control the output power level.

In the preferred embodiment, the bidirectional coupler 74 is also used to sample the amount of the RF output power which is reflected back from the antenna 22 into the output of the RF transmitter section 40. Furthermore, the antenna 22 is matched to the output impedance of the RF transmitter portion 40. Hence, in the absence of any device faults the signal $p_{out}$ on line 80 is indicative of the actual RF output power transmitted by the antenna 22 due to maximum power transfer. However, faults may occur in the mobile terminal 16 which result in the antenna 22 being damaged and/or broken off, for example. In the case where the mobile terminal 16 is dropped by a user, for example, there is a high probability that the antenna 22 will be broken. Since the antenna 22 is typically enclosed in a plastic shroud, however, it may not be visibly apparent that the antenna 22 is broken. If the antenna 22 is broken, an impedance mismatch will typically result between the antenna 22 and the output of the RF transmitter section 40. Alternatively, a failure within the RF transmitter section 40 such as a component failure also may result in an impedance mismatch. In either of these cases, this is likely to result in power being reflected back from the antenna 22 as will be appreciated.

Consequently, power which is reflected back from the antenna 22 on line 78 will enter the coupler 74. The coupler 74 includes a second −20 dB port which outputs a signal $p_{ref}$ on line 90 that is representative of the amount of power which is reflected back. The signal on line 90 is filtered by a low pass filter 82b similar to LPF 82a, and is input to a peak power detector 84b similar to the peak power detector 84a. The output from the peak power detector 84b is provided to an A/D converter 92 which digitizes the vswr signal to produce a digital value $P_{ref}$ on bus 88 which is provided to the processor 30. Again, since the coupling ratio of the coupler 74 and the response characteristics of the peak power detector 84b are known, the value of $P_{ref}$ output from the A/D converter 92 is representative of the amount of power reflected back by the antenna 22. As is discussed below in connection with FIG. 4, such information is utilized by the mobile terminal 16 to identify fault conditions.

Referring briefly to the receiver section 42, such circuitry is configured using known techniques to provide a received signal strength indicator (rssi) signal representative of the power level of any signals received by the mobile terminal 16. The rssi signal is supplied by the receiver section 42 to an A/D converter 94 which digitizes the signal to produce a digital value RSSI. The value RSSI is provided to the processor 30 via the bus 88 such that the processor 30 is capable of determining the strength of the received signals at any given time. Such information is used by the mobile terminal 16 for controlling the output power in an alternative embodiment as discussed below in connection with FIG. 5.

Finally, information which is received by the receiver section 42 is output to an A/D converter 96 which converts the received information into digital data. The output of the A/D converter 96 is input to a digital demodulator 98 which performs the appropriate digital demodulation on the data, depending on the particular modulation schemes used in the system 10 as will be appreciated. The demodulated data is then input from the digital demodulator 98 to the processor 30 for conventional processing.

Figure 3:
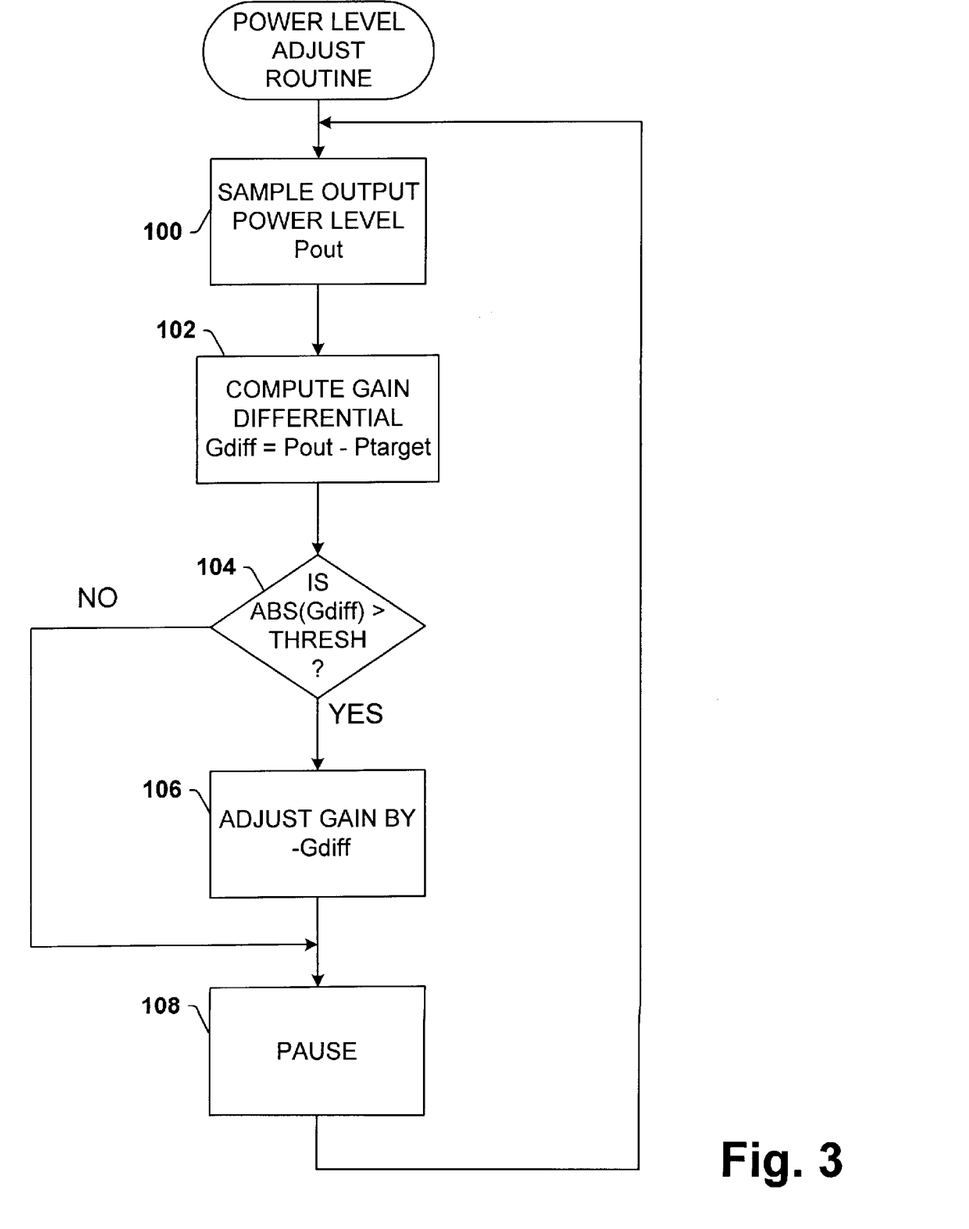
FIG. 3 is a flowchart representing the operation of the mobile terminal according to a power level adjust routine in accordance with the present invention.

Turning now to FIG. 3, a flowchart is shown suitable for programming the operation of the mobile terminal 16 for controlling the RF output power level. Specifically, FIG. 3 illustrates a routine executed by the processor 30 during such times when the mobile terminal 16 is transmitting information. Beginning in step 100, the processor 30 samples the RF output power level $P_{out}$ as provided by the A/D converter 86. Next, in step 102 the processor 30 computes the gain differential $G_{diff}$ between the actual output power level $P_{out}$ and a predefined output power level referred to as the target power level $P_{target}$. Specifically, the processor 30 performs the following calculation $G_{diff}=P_{out}-P_{target}$. The target power level $P_{target}$ is predetermined and preferably is approximately equal to the maximum permitted RF output power of the mobile terminal 16. Accordingly, the processor 30 in step 102 determines the amount by which the actual RF output power of the RF transmitter section 40 exceeds or falls below the desired target power level $P_{target}$. If $G_{diff}$ is a positive value, this indicates that the output power level exceeds the target power level. Similarly, if $G_{diff}$ is a negative value, this indicates that the output power level is below the target power level.

Following step 102, the processor 30 in step 104 determines if the absolute value of $G_{diff}$ is greater than a predetermined threshold (e.g., 1 dB). If yes, the processor 30 proceeds to step 106 in which the processor 30 causes the gain of the RF transmitter section 40 to be adjusted by an amount equal to $-G_{diff}$ to adjust for the difference between the RF output power level and the target power level. Specifically, the processor 30 outputs a value representative of a change in gain of $-G_{diff}$ to the D/A converter 63 which converts the value into a corresponding analog signal used to adjust the gain of the adjustable gain amplifier 62 as discussed above. In this manner, if the RF output power level falls below the target power level by more than the threshold value, the gain of the amplifier 62 is increased by the difference. On the other hand, if the RF output power level exceeds the target power level by more than the threshold value so as to potentially exceed the permissible output power level for mobile terminals, the gain of the amplifier 62 is decreased by the difference. In this manner, the RF output power level can be maintained.

Following step 106, the processor 30 proceeds to step 108 in which it waits a predetermined time period before returning to step 100 and again sampling the RF output power level. Such predetermined time period can be essentially any value depending on the desired frequency of control. For example, the predetermined time period can be 30 seconds such that the output power level is adjusted every 30 seconds. If the mobile terminal 16 utilizes frequency hopping the predetermined time period may be set such that the processor 30 adjusts the output power at least once at the beginning of each channel in the hopping sequence. Alternatively, the mobile terminal 16 may rely on the EEPROM 38 to adjust the power level for each channel when frequency hopping, and the processor 30 continues to sample the output power every 30 seconds to periodically adjust for variations in output power level due to other conditions such as temperature. Following step 108, the processor 30 returns to step 100 as shown.

Furthermore, it is noted that if in step 104 the absolute value of $G_{diff}$ does not exceed the predetermined threshold, the processor 30 concludes that it is not necessary to adjust the output power level. Accordingly, the processor 30 proceeds directly from step 104 to step 108. In addition, it is noted that the routine shown in FIG. 3 is not executed during those times when the mobile terminal 16 is not transmitting.

Figure 4:
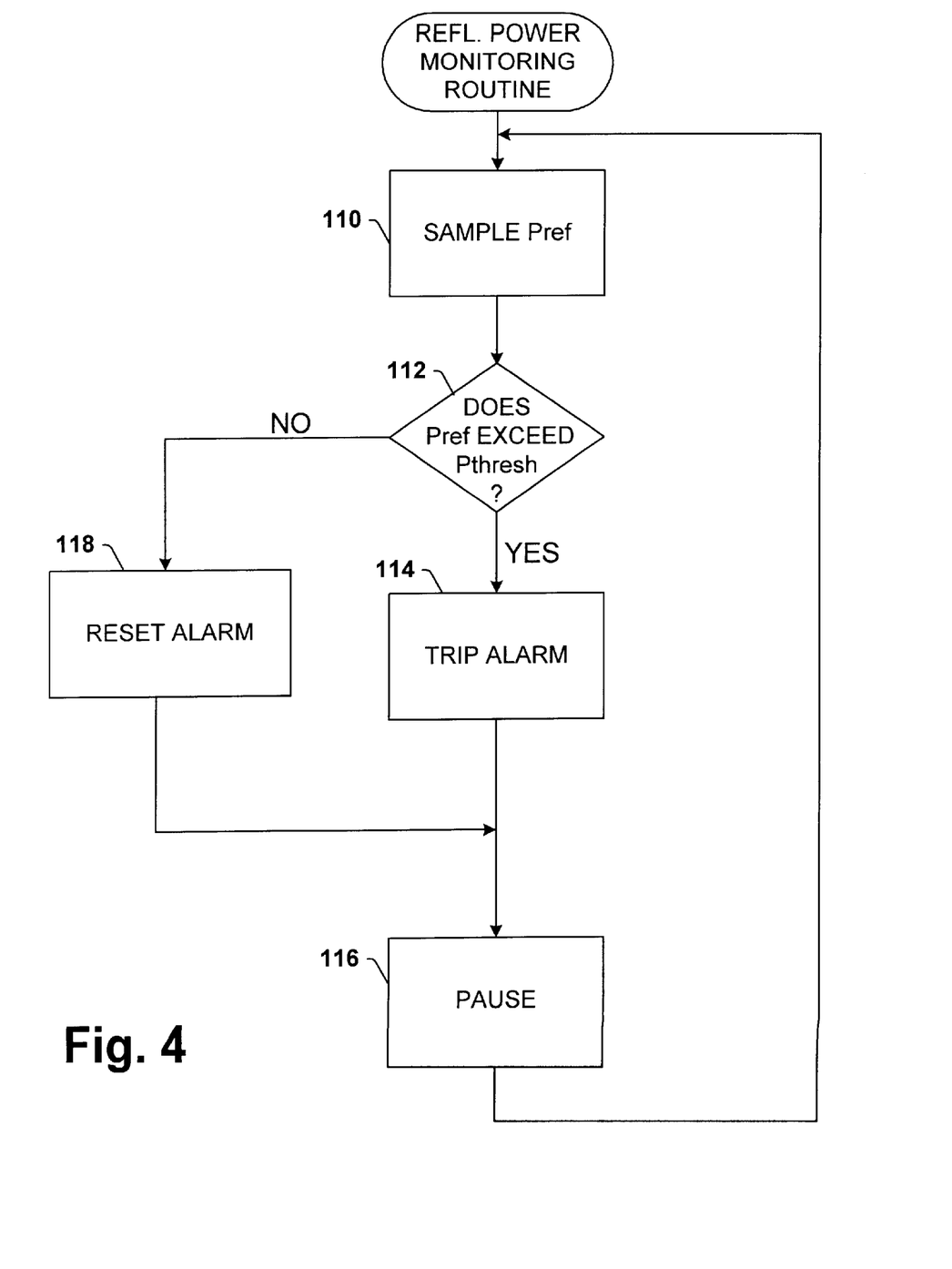
FIG. 4 is a flowchart representing the operation of the mobile terminal according to a reflected power monitoring routine in accordance with the present invention.

FIG. 4 is a flowchart representing a routine executed by the processor 30 during transmission for monitoring the amount of power reflected back from the antenna 22 as discussed above. The routine can be executed concurrently with the routine provided in FIG. 3, although a mobile terminal 16 could also use the routine independent of the routine for adjusting the power level as will be appreciated. In step 110, the processor 30 samples the value of $P_{ref}$ provided by the A/D converter 92. Next, in step 112 the processor 30 determines if the value of $P_{ref}$ exceeds a predetermined threshold $P_{thresh}$. The predetermined threshold is selected so as to represent what is expected to be the maximum reflected output power under normal conditions (e.g., a properly matched antenna and transmitter). If the value of $P_{ref}$ does exceed such threshold, the processor 30 proceeds to step 114 in which it displays an alarm on the display 34, for example. The processor 30 then proceeds to step 116 in which it waits a predetermined time period prior to returning to step 110 and again sampling the reflected power based on the value of $P_{ref}$. As in step 108 above, the predetermined time period can be set at a desired value (e.g., 30 seconds) thereby determining the frequency at which the reflected power is evaluated.

It is noted that in the event the value of $P_{ref}$ does not exceed the predetermined threshold as determined in step 112, the processor 30 proceeds to step 118. In step 118 the processor 30 resets any alarm which might have been tripped in step 114 so as to indicate a fault condition has been corrected. Alternatively, if the alarm has not been tripped previously in step 114, the alarm simply remains off in step 118. Following step 118 the processor 30 continues to step 116.

Figure 5:
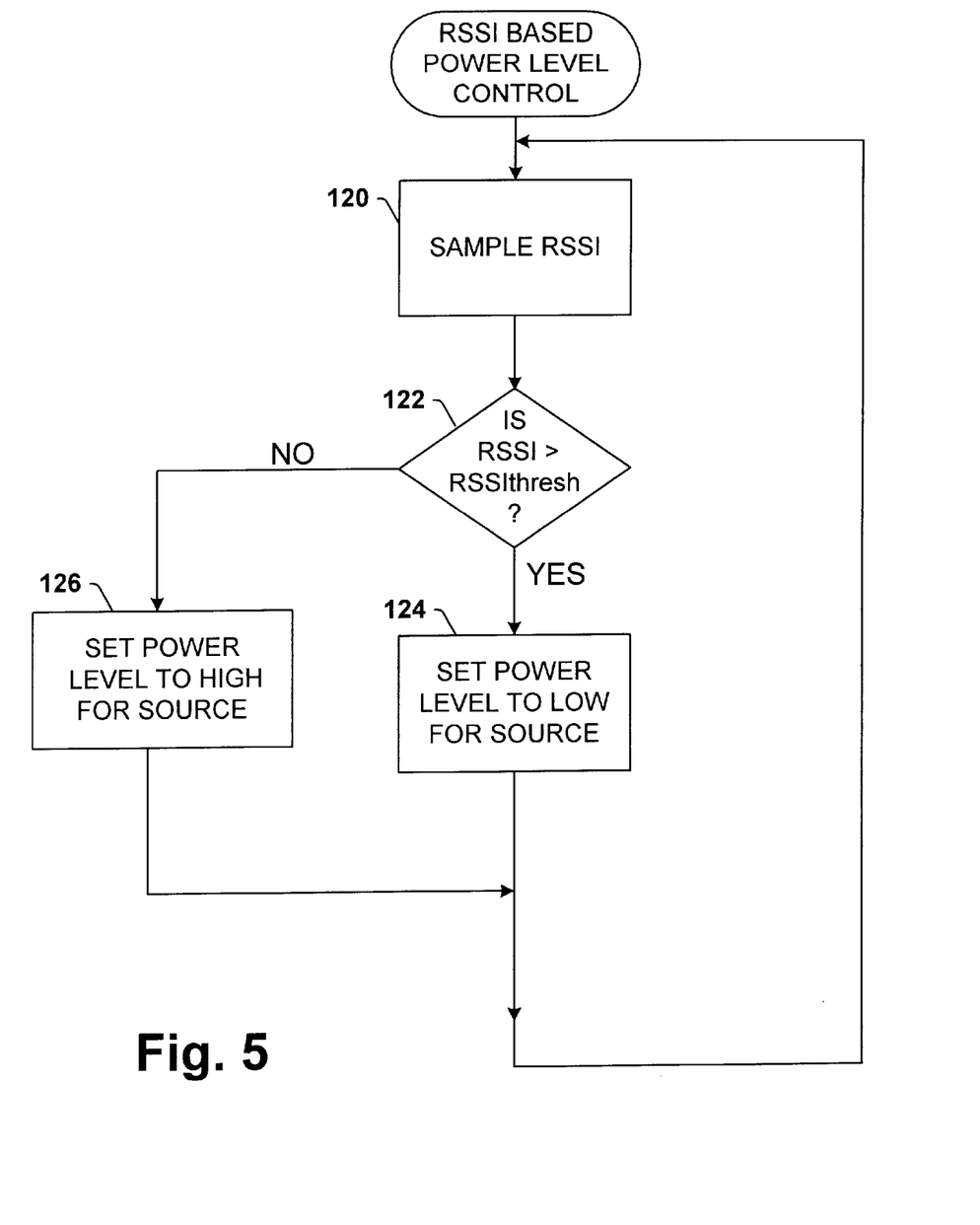
FIG. 5 is a flowchart representing the operation of the mobile terminal according to a RSSI based power level control in accordance with the present invention.

FIG. 5 represents a flowchart describing operation of the mobile terminal 16 in an embodiment which controls the output power level based on the received signal strength. The routine shown in FIG. 5 can be executed concurrently with the power level adjustment routine executed in FIG. 3, however the processor 30 preferably is programmed to suspend the power level adjustment routine when the mobile terminal 16 goes into a low power mode as discussed below.

More specifically, in step 120 the processor 30 samples the detected power as represented by the value of RSSI output from the A/D converter 94. Next, the processor 30 determines in step 122 if the sampled value of RSSI is greater than a predetermined threshold $RSSI_{thresh}$. In the preferred embodiment, the predetermined threshold $RSSI_{thresh}$ is selected such that if a signal is received by the mobile terminal 16 having a signal strength greater than RSSI$_{thresh}$, it can be reasonably assumed that the source of the signal is relatively close. Accordingly, the mobile terminal 16 need not transmit information back to the source of the signal at the maximum RF output power level. This allows the mobile terminal 16 to reduce its RF output power level, at least with respect to the source of the incoming signal (e.g., a base station 12), thereby conserving power. Since mobile terminals 16 typically are battery powered, it is useful to be able to reduce the RF output power to conserve power while still maintaining sufficient output power to communicate. It will be appreciated that there could be varying degrees of RSSI$_{thresh}$ which correspond to different levels to which the RF output power level could be reduced while still maintaining reliable communication. Thus, for example, there may be ten or twenty different RSSI$_{thresh}$ values which have associated with them a change in the power gain level which can be asserted to achieve various corresponding output power levels.

Thus, if the RSSI value is greater than RSSI$_{thresh}$ in step 122 the processor 30 proceeds to step 124. In step 124 the processor 30 sets the gain of the RF transmitter section 40 to a low level which is still sufficient for carrying out communications with the source of the incoming signal. This can be accomplished by reducing the gain of the amplifier 58 and/or 62 by the processor 30 providing appropriate values to the D/A converters 60 and 63, for example. Alternatively, in the case where the power amplifier 68 is adjustable, the processor 30 can reduce the gain of the power amplifier 68 to a low level. It is noted that in the event the output power level is reduced in step 124, the processor 30 is programmed to suspend the power level adjust routine of FIG. 3 in order to prevent conflict between the two routines.

Also, in the event the mobile terminal 16 is likely to receive signals from two or more different sources, the processor 30 preferably is programmed to identify the source of the incoming signal and store in memory this information together with the RSSI value. In this manner, the processor 30 is programmed to reduce the output power level only with respect to transmissions which are directed to those sources which resulted in signals being received which exceeded the predetermined threshold.

Following step 124, the processor 30 returns to step 120. If, in step 122, the RSSI value for an incoming signal is not greater than the threshold, the processor 30 proceeds to step 126. In step 126 the processor 30 returns/maintains the gain of the RF transmitter section 40 at its ordinary high level with respect to communications with the source of the signal. Again this can be accomplished by the processor 30 increasing the gain of the amplifier 58 and/or 62 by providing appropriate values to the D/A converters 60 and 63, for example. Alternatively, the gain of the RF power amplifier 68 can be increased in the case where it is adjustable by the processor 30. In addition, in step 126 the processor 30 can reinitiate the power level adjustment routine of FIG. 3 and control the output power. The processor 30 then proceeds from step 126 to step 120 as shown.

The routines shown in FIGS. 3–5 can be carried out substantially simultaneously in the mobile terminal 16 as discussed above. In addition, any of the routines may be executed to the exclusion of the others without departing from the scope of the invention.

Figure 6:
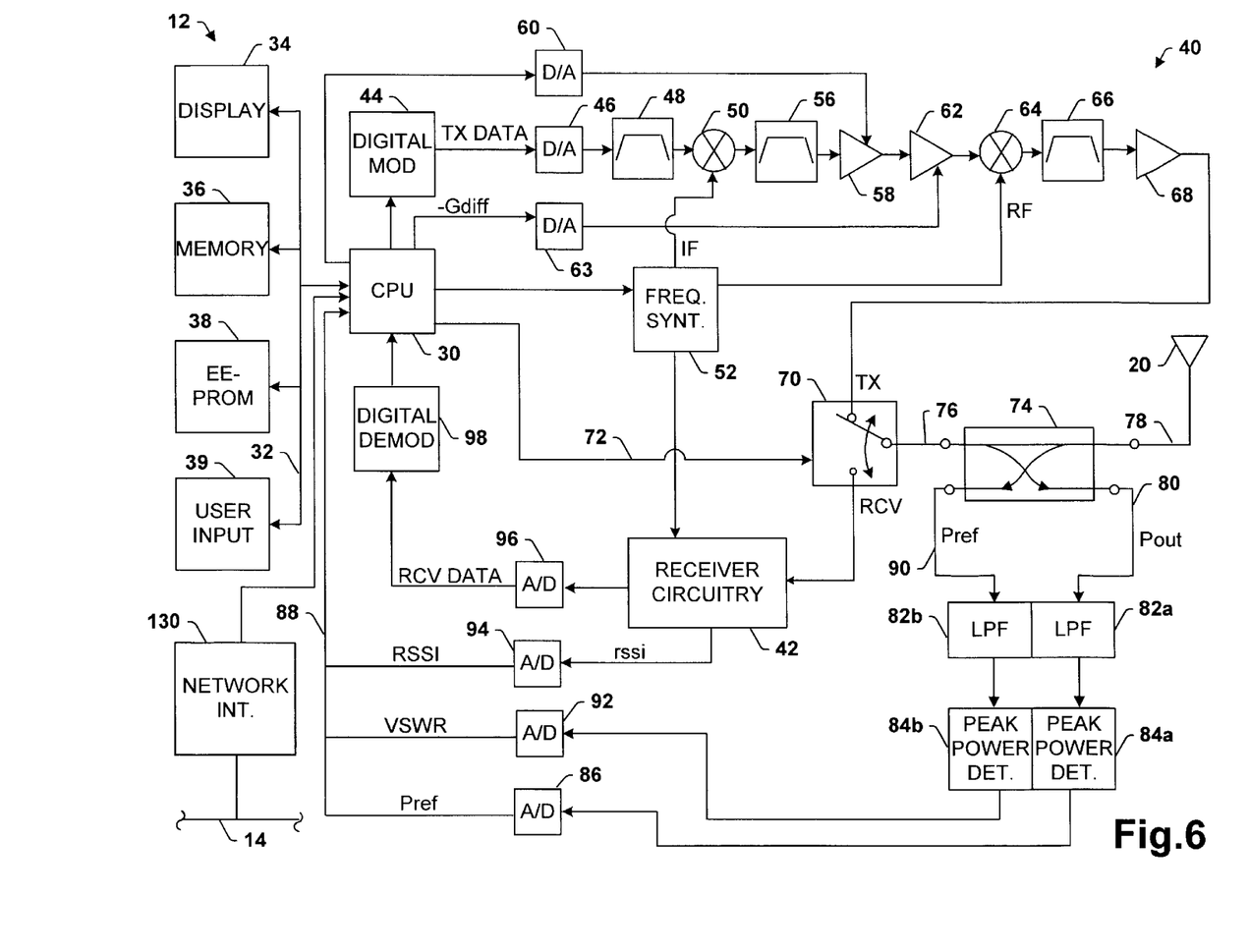
FIG. 6 is a detailed block diagram of a base station in accordance with the present invention.

The various aspects of the mobile terminal 16 as described above can also be utilized in other devices within the cellular communication network. For example, FIG. 6 illustrates a block diagram of a base station 12 which is substantially identical in construction and operation to the mobile terminal 16. The RF transmitter section 40 and the RF receiver section 42 are essentially the same as the mobile terminal 16, and hence the same description applies. The only significant difference is that the base station 12 is also connected to the system backbone 14 via a conventional network interface 130. Specifically, the processor 30 is coupled to the system backbone 14 by the network interface 130. Thus, the base station 12 is able to communication directly with devices on the system backbone 14. As far as radio communications, the base station 12 utilizes the RF transmitter section 40 and receiver section 42 in the same manner as the mobile terminal 16. Hence, further descriptive detail is omitted.

A wireless base station 12' would, in relevant part, be virtually identical to a mobile terminal 16 as shown in FIG. 2, but perhaps would not include the same user input features, etc. This is because the wireless base station 12' is intended to serve primarily as a repeater between the mobile terminals 16 and the base station 12. Typically it will not be used to receive information directly from a user. Similarly, the base stations 12 also may omit and/or have only limited user input devices.

In the exemplary embodiment described above, the RF output power level is based on the value of P$_{out}$ which, in a matched system, is directly related to the RF output power level. In an alternative embodiment, on the other hand, the processor 30 may compute the RF output power level based on the values of P$_{out}$ and P$_{ref}$ using known techniques. Such an embodiment may be useful in a device in which the output of the RF transmitter is not properly matched to its antenna, for example. Similarly, the value of P$_{ref}$ alone is sufficient for a normally matched device in relation to detecting a fault. However, the processor 30 in a different embodiment could calculate the actual voltage wave standing ratio (VSWR) using known techniques based on the values of P$_{out}$ and P$_{ref}$. The calculated VSWR could then be compared to a threshold for detecting a fault condition.

Although the invention has been shown and described with respect to certain preferred embodiments, it is obvious that equivalents and modifications will occur to others skilled in the art upon the reading and understanding of the specification. For example, the various power level, p$_{ref}$ and rssi control aspects of the invention can be applied to virtually any type of radio even outside of cellular communication networks. Furthermore, with respect to controlling the RF output power level, the routine in FIG. 3 can be modified without departing from the scope of the invention. For example, rather than maintaining the RF output power level at substantially the predefined target power level, the processor 30 may instead simply control the gain of the amplifiers such that the RF output power level does not exceed the predefined target power level. In other words, it may be acceptable simply to ensure that the RF output power level does not exceed the maximum power output established by a regulating body such as the FCC.

In the above embodiments, the EEPROM 38 stores deviation gain values initially obtained by the manufacturer. In another embodiment, however, the processor 30 is programmed to update periodically the deviation gain values stored in the EEPROM 38. For example, the processor 30 is programmed to execute a plurality of test cycles for each update. Each test cycle involves the processor 30 holding the gain of each of the amplifiers 58, 62 and 68 constant. Then, in each test cycle the processor 30 causes a sequence of test data to be transmitted by the transmitter section 40 at each of the respective frequencies in the hopping sequence. At the same time, the processor 30 samples the RF output power level of the transmitted signal at each of the respective frequencies via the output of the A/D converter 86. The sampled output power levels are stored temporarily in memory for the plurality of test cycles, and the processor 30 then computes the average variation in the output power levels for the different frequencies relative to each other. Based on such information, the processor 30 then determines appropriate deviation gain values for each of the frequencies in the hopping sequence in order to compensate for any differences in the RF output power level. These values are then stored in the EEPROM 38 upon completion of the update. The updated values are then utilized in place of any previous values at least until the next update is performed.

Furthermore, in order to accommodate different output power restrictions in various countries and/or in accordance with different standards, the EEPROM 38 or other non-volatile memory device may contain several different tables of deviation gain values. Each table can be associated with a corresponding output power restriction or standard.

The present invention includes all such equivalents and modifications, and is limited only by the scope of the following claims.

What is claimed is:

1. A cellular communication device for a cellular communication network, comprising:
   a radio-frequency (RF) transmitter for transmitting an RF signal at an output power level to one or more other devices in the cellular communication network;
   an RF receiver for receiving an RF signal from one or more other devices in the cellular communication network; and
   a gain control circuit for sampling the output power level signal, digitizing the sampled output power level signal, computing a gain differential between the sampled output power level signal and a predefined output power level, wherein if the absolute value of the gain differential is greater than a predetermined threshold, a gain of the RF transmitter is then adjusted by an amount substantially equal to the gain differential in order to maintain a substantially constant output level at the RF transmitter corresponding to the predefined output power level.

2. The device of claim 1, wherein the gain control circuit includes a coupler for sampling the output power level.

3. The device of claim 2, wherein the gain control circuit further includes a peak power detector connected to an output of the coupler.

4. The device of claim 2, wherein the gain control circuit further includes an A/D converter for digitizing the sampled output power level signal and a processor for processing the digitized sample.

5. The device of claim 1, wherein the gain control circuit includes means for adjusting a gain of an amplifier included in the RF transmitter.

6. The device of claim 5, wherein the amplifier comprises an amplifier for amplifying an intermediate frequency signal within the RF transmitter.

7. The device of claim 5, wherein the amplifier comprises a power amplifier for amplifying the RF signal transmitted by the RF transmitter.

8. The device of claim 1, wherein the RF transmitter employs frequency hopping techniques and the gain control circuit samples the output power level at approximately each frequency.

9. The device of claim 1, wherein the RF transmitter employs frequency hopping techniques and the gain control circuit samples the output power level at times independent of where the RF transmitter is in a frequency hopping sequence.

10. The device of claim 1, wherein the RF transmitter employs frequency hopping techniques and includes another gain control circuit which adjusts the gain of the RF transmitter based on where the RF transmitter is in a frequency hopping sequence using a set of predetermined gain values.

11. The device of claim 1, wherein the device comprises an antenna at the output of the RF transmitter and a circuit for sensing an amount of output power reflected back into the output of the RF transmitter.

12. The device of claim 11, wherein the circuit for sensing triggers an alarm in the event the reflected power exceeds a predetermined threshold.

13. The device of claim 1, further comprising a circuit for obtaining a received signal strength indicator (RSSI) indicative of the strength of a signal received by the RF receiver, and a circuit for adjusting the predefined output power level based on the RSSI.

14. The device of claim 13, wherein in the event the RSSI exceeds a predetermined threshold, the predefined output power level is set at a value lower than when the RSSI does not exceed the predetermined threshold.

15. The device of claim 1, wherein the device comprises a mobile terminal.

16. The device of claim 1, wherein the device comprises a base station.

17. A method for controlling a cellular communication device for a cellular communication network, wherein the cellular communication device includes a radio-frequency (RF) transmitter for transmitting an RF signal at an output power level to one or more other devices in the cellular communication network, and an RF receiver for receiving an RF signal from one or more other devices in the cellular communication network, the method comprising the steps of:
   sampling the output power level to obtain a samples output power level signal, digitizing the sampled output power level signal, computing a gain differential between the sampled output power level signal and a preferred output power level, wherein if the absolute value of the gain differential is greater than a predetermined threshold, a gain of the RF transmitter is then adjusted by an amount substantially equal to the gain differential in order to maintain a substantially constant output power level of the RF transmitter corresponding to the predefined output power level.

18. A radio, comprising:
   a radio-frequency (RF) transmitter for transmitting an RF signal at an output power level; an RF receiver for receiving an RF signal; and
   a gain control circuit for sampling the output power level to obtain a sampled output power level signal, digitizing the sampled output power level signal, computing a gain differential between the sampled output power level, wherein if the absolute value of the gain differential is greater than a predetermined threshold, a gain of the RF transmitter is then adjusted by an amount substantially equal to the gain differential in order to maintain a substantially constant output power level of the RF transmitter corresponding to the predefined output power level.

* * * * *